United States Patent [19]

Giolitti et al.

[11] 4,058,707

[45] Nov. 15, 1977

[54] SYSTEM FOR INTRODUCING THE INSTRUCTIONS OF A PROGRAM INTO A PROGRAMMABLE OFFICE MACHINE

[75] Inventors: Nicolo Giolitti; Sergio Garberi, both of Ivrea (Turin), Italy

[73] Assignee: Ing. C. Olivetti & C., S.p.A., Ivrea (Turin), Italy

[21] Appl. No.: 679,107

[22] Filed: Apr. 21, 1976

[30] Foreign Application Priority Data

May 2, 1975 Italy .................................. 68115/75

[51] Int. Cl.[2] ........................ G06K 17/00; G06K 7/04; B41J 5/30

[52] U.S. Cl. .................................... 235/448; 235/419; 340/365 R; 197/19

[58] Field of Search ..................... 235/61.6 R, 61.6 H, 235/61.11 C; 340/365 R, 358, 173 RC; 179/90 B, 90 CS; 197/19; 360/79

[56] References Cited

U.S. PATENT DOCUMENTS

| | | | |
|---|---|---|---|
| 3,012,717 | 12/1961 | Sobisch et al. | 235/61.6 R |
| 3,436,526 | 4/1969 | Biegel et al. | 235/61.6 R |
| 3,495,222 | 2/1970 | Perotto et al. | 235/61.6 R |
| 3,993,876 | 11/1976 | Davis | 179/90 B |

*Primary Examiner*—Daryl W. Cook

*Attorney, Agent, or Firm*—Schuyler, Birch, Swindler, McKie & Beckett

[57] ABSTRACT

A system for introducing the instructions of a program into an accounting or similar programmable office machine comprises a drum mounted rotatable into a container and carrying at its periphery a plurality of removable and programmable code bars. A feed mechanism and a reading unit are disposed into the office machine for rotating step by step the drum with respect to the container to bring serially the code bars in front of the reading unit. A locking mechanism locks the container into the office machine during the reading cycle. At the end of the reading of the program the locking mechanism is released allowing the container to be removed from the office machine.

14 Claims, 6 Drawing Figures

SYSTEM FOR INTRODUCING THE INSTRUCTIONS OF A PROGRAM INTO A PROGRAMMABLE OFFICE MACHINE

BACKGROUND OF THE INVENTION

1. Field of the Invention

The present invention relates to a programming system for introducing the program into an accounting, calculating or other office machine which performs data-processing operations, wherein the instructions of the program are represented by a series of coded storage elements disposed around the periphery of a circular carrier, which may be referred to as a drum, and comprising a reading unit for reading the storage elements and a feed mechanism adapted to be actuated to cause the carrier to rotate with respect to the reading unit.

In programmable office machines having an internal memory of small capacity there is the need to introduce the instructions of the working program of the machine from time to time. These programs are normally stored permanently on readily handleable carriers or recording media such that the recorded instructions do not suffer impairment owing to prolonged use of the carrier or recording medium.

2. Description of the Prior Art

It is known to use a magnetic card, a magnetic tape or a punched card as recording carrier or medium. Generally, however, while these are inexpensive and readily handleable carriers, they require rather complicated and costly reading devices which have a considerable effect on the total cost of the machine to which they are applied.

A calculating machine having a movable carriage is also known which employs for introduction of the program instructions a drum arranged inside the machine and which bears round its periphery a plurality of lamellae or plates provided with a series of teeth which carry working instructions stored in coded form. The cylinder is rotated in conjunction with the movement of the carriage and the various plates are read one after the other by a series of sensing levers to execute the working instructions represented by the combinations of the teeth.

This system requires simple reading means of low cost and which can supply information which can be executed without lengthy conversion operations; on the other hand, since the drum is mounted inside the machine and is an integral part thereof, replacement thereof cannot be carried out directly by the operator, but only by technicians equipped with suitable tools. Consequently, the services performed by the machine are limited in practice to the single program built into the machine.

SUMMARY OF THE INVENTION

One object of the present invention is to provide a system which enables a program stored in an external storage unit to be transferred instruction by instruction to an internal memory of an office machine, wherein both the external storage unit and the transfer system itself are very reliable and not expensive.

A second object of the present invention is to use as the external storage unit a carrier which bears coded storage elements, is readily usable by the machine on which it is applied and wherein abnormal intervention by the operator on the mounting of this unit on the machine has no effect on the transfer or on the working out of the program itself.

According to the present invention there is provided a system for introducing the instructions of a program into a programmable office machine which performs data-processing operations, comprising a series of coded instruction storage elements disposed round the periphery of a circular carrier, a reading unit for reading the storage elements and a feed mechanism adapted to be actuated to cause the carrier to rotate with respect to the reading unit, wherein the carrier is mounted rotatably on a support, which in turn is mounted removably on the machine and is provided with a locking element engageable by corresponding locking means of the machine for locking the support in position with respect to the reading unit, and wherein the carrier is provided with transmission elements adapted to engage the feed mechanism removably on the mounting of the support on the machine, and with a control element adapted to indicate the end of the program, a sensing element of the machine co-operating with the control element of the cylinder being provided for deactivating the feed mechanism and rendering the locking means releasable at the end of the reading of the program.

BRIEF DESCRIPTION OF THE DRAWINGS

The invention will be described in more detail, by way of example, with reference to the accompanying drawings, wherein.

DESCRIPTION OF A PREFERRED EMBODIMENT OF THE INVENTION

Figure 1:
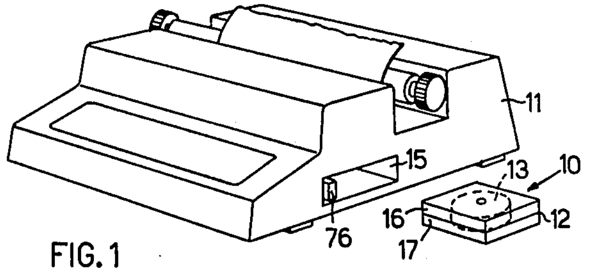
FIG. 1 is a perspective view of an accounting machine employing a system embodying the invention.
Figure 2:
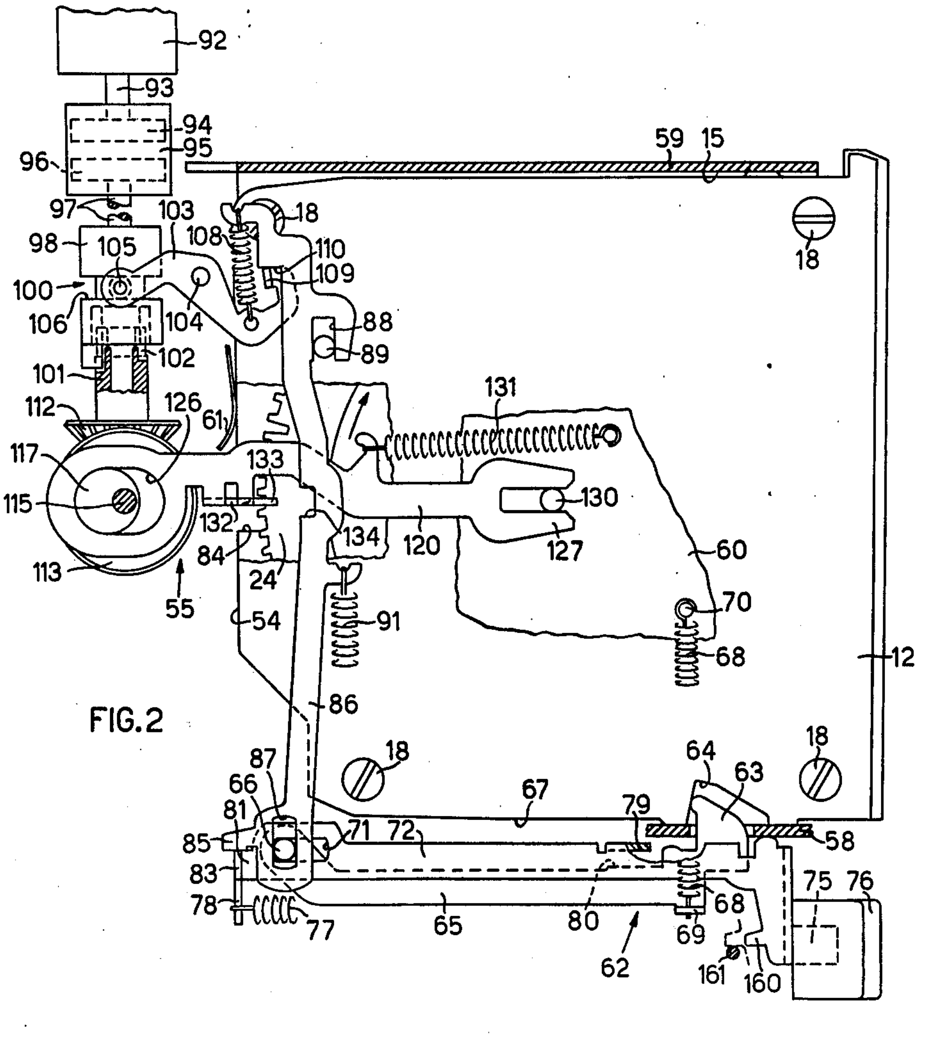
FIG. 2 is a first plan view, partly in section, of the system in a first working position.
Figure 5:
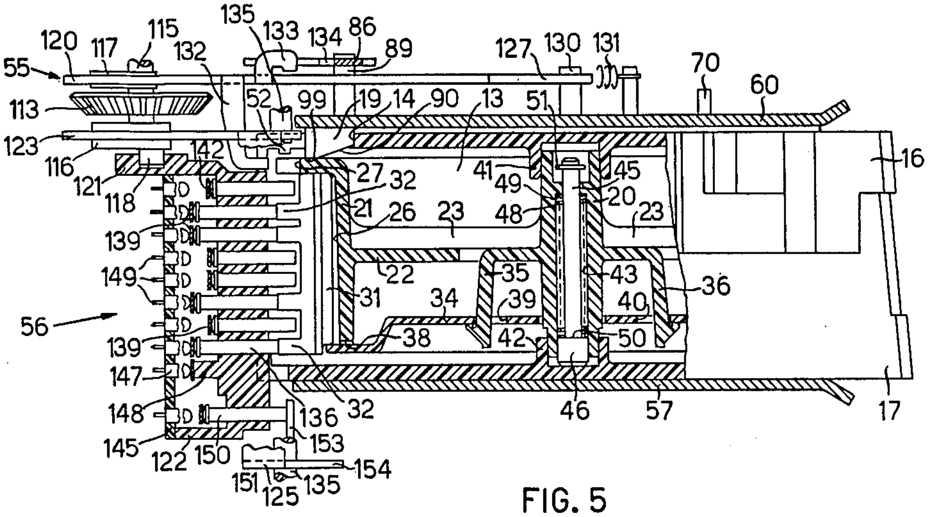
FIG. 5 is a first side view, partly in section, of the system in a second working position.

Referring to FIG. 1, the system embodying the invention includes an external storage unit 10 in which the instructions of a working program for an accounting machine 11 are stored permanently in binary code in a manner which will be described in detail hereinafter. The unit 10 comprises a container 12 of substantially parallelepipedal form inside which a drum 13 is rotatably mounted. The container 12 is of plastics material and is composed of top and bottom parts 16 and 17 (FIG. 5), which are held together by means of a set of clamping screws 18 (FIG. 2).

The drum 13 (FIG. 5) comprises a central hub 20 and an outer cylinder 21 which is hollow internally and connected to the hub 20 by means of a transverse flange 22 reinforced by ribs 23.

The outer cylinder 21 is provided at the top with a toothed rim 24 (FIG. 3) and in correspondence with the teeth 25 of the rim 24, it bears a plurality of radial slots 26 opening into its outer cylindrical surface and shaped to accommodate removably inside each of them a storage element comprising a code bar 30. Moreover, between one pair of adjacent teeth 25 of the toothed rim 24 there is formed a space 27 deeper than the other spaces and which defines the zero position of the drum 13. In correspondence with the two teeth 25 immediately following the space 27, two fixed tongues 73 and 74 are formed on the cylinder 21 in place of the radial slots 26.

The code bars 30 are of plastics material and each comprise a vertical shank 31 (FIG. 5) shaped to mate with the corresponding slot 26, and a series of eight horizontal tongues 32 which project from the periphery of the cylinder 21 and can be individually snapped off. Each bar 30 can thus contain an instruction of eight elementary information items or bits in binary code, one for each tongue 32; more particularly, the presence of a tongue 32 corresponds to the logical "1" value, while its absence corresponds to the logical "0" value. In this way, by arranging a certain number of bars 30, for example ninety-four, on the drum 13, it is possible to store permanently a working program having a capacity of $94 \times 8$ bits.

A bottom flange 34 of the drum 13 is mounted removably on the hub 20 and is kept urged against a bottom shoulder 38 of the cylinder 21 by two hooks 35 and 36 fixed to the central flange 22 and co-operating with two corresponding slots 39 and 40 in the flange 34 itself. When this bottom flange 34 is removed, it permits the mounting of the code bars 30 and it prevents emergence thereof from the slots 26 when it is duly mounted on the hub 20. The shape of the shanks 31 and slots 26 is such that the bars 30 are radially immovable (see FIG. 3); the bars can only be slid in and out axially when the flange 34 is removed.

The parts 16 and 17 of the container 12 are shaped internally to define two bushings 41 and 42, inside which the ends of the hub 20 are seated. This hub 20 is provided internally with a through central bore 43 in which a pin 45 is arranged. This pin 45 has an end 46 which is kept constantly bearing against the bottom of the part 17 by the section of a spiral spring 48 compressed between a shoulder 49 of the hub 20 and a shoulder 50 of the end 46. A collar 51 limits the travel of the pin 45 with respect to the hub 20.

On the upper part 16 of the container 12 there is moreover formed a positioning tooth 52 (FIG. 5) which is adapted to co-operate with the space 27 of the toothed rim 24 to prevent rotation of the drum 13 when the container 12 is not inserted in the machine 11.

Inside the container 12 there is also arranged a positioning device 28 (FIG. 3) which comprises a lever 29 pivoted on a pin 33 on the lower part 17 and provided with a detent 37 normally held against the toothed rim 24 by the action of a leaf spring 44 compressed between a shoulder 47 of the part 17 and a stud 53 of the lever 29.

The container 12 is inserted in a recess 15 (FIG. 1) of the machine 11, inside which there are arranged feed or advancing means 55 (FIG. 2) for causing the drum 13 to rotate clockwise and reading means 56 (FIG. 3) for reading the instructions stored in binary code on the bars 30 and transferring the instructions one at a time to an internal memory of the machine of known type and not shown in the drawings. More particularly, the recess 15 is defined by a lower plate 57 (FIG. 5), two side plates 58 and 59 (FIG. 2) and an upper plate 60 which are fixed together and rendered fast with the frame of the machine.

When the container 12 is inserted in the recess 15, it has one end wall 54 thereof, in which an aperture 84 is formed, co-operating with a leaf spring 61 supported by the side plate 59 (FIG. 3) and one side wall 67 thereof co-operating with locking means 62 (FIG. 2). The spring 61 tends to eject the container which is held in place by the locking means 62.

The upper part 16 of the container 12 (FIG. 5) is moreover provided with an opening 14 into which a block 19 carried by the upper plate 60 enters itself, the block having a horizontal bearing surface 99 with which the drum 13 co-operates, and an inclined lead-in surface 90. The block slides the drum down against the action of the spring 48 and disengages the tooth 52 from the space 27.

Figure 6:
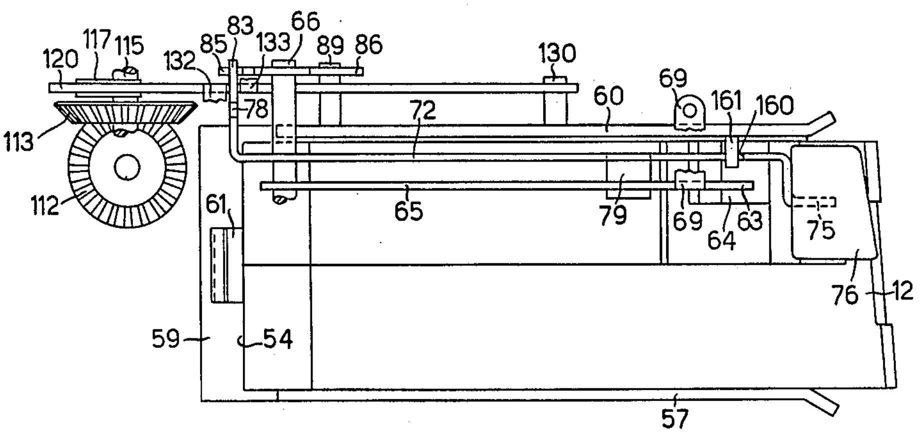
FIG. 6 is a second side view, partly in section, of the system.

The locking means 62 (FIGS. 2 and 6) comprise a tooth 63 which becomes seated in a corresponding recess 64 of the container 12. The tooth 63 is carried by a lever 65 which is pivoted on a fixed pin 66 and is urged against the side 58 by a spring 68 stretched between an upper lug 69 of the lever and a pin 70 carried by the upper plate 60. On the pin 66 there is also pivoted, by means of a slot 71 therein, a lever 72 which is disposed above the lever 65 and carries at one end 75 a control key 76. The lever 72 is provided with a tooth 160 which is adapted to co-operate with a stop pin 161 carried by the plate 60. The lever 72 is urged to the right and against the side 58 by a spring 77 stretched between an outer projection 78 thereof and a fixed point of the frame of the machine. The lever 72 has a bottom bent portion 79 adapted to co-operate with a corresponding shoulder 80 of the lever 65 for retracting the tooth 63.

Moreover, the lever 72 is provided at one end 81 with a lug which is turned upwardly and normally co-operates with a corresponding lug 85 of a slider 86. The slider 86 has a slot 87 co-operating with the pin 66 and a fork 88 guided by a pin 89 carried by the upper plate 60. A spring 91 keeps the slider 86 constantly biased towards the lever 72.

The feed means 55 for causing the drum 13 to rotate when the container 12 is inserted in the recess 15 comprise a driving unit 92 which continuously rotates a shaft 93 connected to a driving element 94 of a clutch 95 of known type and indicated only diagrammatically in the drawings. A driven element 96 of the clutch 95 is adapted to be coupled selectively with the element 94 to set in rotation a driven shaft 97 to which there is keyed a first part 98 of a sliding coupling 100. This first part 98 is coupled to a second part 101, with respect to which it can be slid axially in longitudinal grooves 102, by means of a rocking lever 103. This lever 103 is pivoted on a fixed pin 104 and has a stud 105 seated in a circumferential groove 106 of the movable part 98. The lever 103 is connected to the slider 86 by means of a spring 108 and has a lug 109 co-operating with a shoulder 110 of the slider 86.

The part 101 of the coupling 10 has keyed to it a bevel gear 112 which is constantly in mesh with a corresponding bevel gear 113 keyed on a shaft 115 mounted rotatably in the fixed frame of the machine 11. The shaft 115 rotates a cam 116 (FIG. 3) with which an arm 123 on a bail lever 125 co-operates under the action of a spring 157. On the cam 116 there is fixed a crank pin 118 which co-operates in turn with a fork 121 of a box 122. On the shaft 115 there is moreover keyed an eccentric disc 117 (FIG. 2) with which a connecting rod 120 co-operates by means of a slot 126 therein, the connecting rod having an end 127 shaped in the form of a fork which is guided by a pin 130 carried by the upper plate 60.

The connecting rod 120 is constantly biased to the right by the action of a spring 131 and is provided with a bottom tooth 132 (see also FIG. 5) adapted to engage with the toothed rim 24 of the drum 13, and with a top lug 133 adapted to engage in a recess 134 of the slider 86.

The box 122 (FIGS. 3 and 5) is pivoted on a fixed pin 135 and carries inside it the reading means 56, which comprise a series of eight sensing pins 136 which are aligned vertically and are each slidable in a corresponding hole 137 in the box 122. A plurality of leaf springs 139 formed from a single metal plate 140 keep the heads 142 of the sensors 136 constantly urged against an inner surface 143 of the box 122. The metal plate 140 is fixed to the inside of the box 122 by means of a bolt 141.

For closing the box 122 there is provided a cover 145 of plastics material which carries inside it a series of ten fixed contacts 147 aligned vertically, eight of them in front of the sensors 136, and each adapted to co-operate with a corresponding leaf spring 139. One of the springs 139 is held constantly against the ninth fixed contact 147 by a stud 148 of the box 122. Conductors 149 connected in known manner to the internal memory of the machine depart from the fixed contacts 147. The contact 147 opposite the stud 148 is constantly supplied with an electric reference voltage.

A synchronising sensor 150 (FIGS. 4 and 5) arranged below the eight sensors 136 and aligned vertically with them is slidable in a hole 151 in the box 122 and is adapted to co-operate with a lug 153 carried by an arm 154 of the lever 125 and with a corresponding spring 139. The leaf spring 139 which co-operates with the sensor 150 is interposed between two fixed contacts 155 and 156 carried by the cover 145 and is normally in contact with the first of the two. (The contact 156 is the tenth of the contacts 147). The contacts 155 and 156, in turn, are connected by means of two conductors 158 and 159, respectively, to an enabling circuit of known type and not shown in the drawings, which enables the transfer of the signals coming from the conductors 149 to the internal memory of the machine.

The system described operates in the following manner. In order to store permanently in the unit 10 a working program for the machine 11 already prepared with sequential eight-bit instructions, each individual instruction is stored in a code bar 30 by removing the tongues 32 which are to correspond to the logical "0" value. The bars 30 are then inserted in the slots 26 of the drum 13 following the anticlockwise direction (FIG. 3) and commencing from the slot 26 closest to the fixed tongue 74. All the bars 30 are then locked, being urged upwardly (FIG. 5), by the bottom flange 34, which is mounted on the drum 13 by causing the two slots 39 and 40 to engage with the hooks 35 and 36, respectively, of the transverse flange 22.

The drum 13 prepared in this way is housed in the lower part 17 of the container 12 so that the lower end of the hub 20 is inserted in the bush 42. The upper part 16 is then put on, the upper end of the hub 20 being made to fit into the bushing 41, and finally the two parts 16 and 17 of the container 12 are fixed together with the corresponding clamping screws 18.

When the container 12 is not inserted in the recess 15 of the machine 11, the drum 13 is disposed so that it is shifted fully upward, being urged by the spring 48. Moreover, the positioning tooth 52 is inserted in the space 27 to prevent the drum 13 rotating and the fixed tongue 73 is located in correspondence with the aperture 84.

In order to transfer the program from the external unit 10 to the internal memory of the machine 11, the container 12 is inserted into the recess 15 so that its end wall 54 is directed towards the inside and its side wall 67 is directed towards the side 58.

When the container 12 has been fully inserted into the recess 15, the locking tooth 63 becomes seated in the recess 64 and prevents the container 12 from being ejected by the leaf spring 61. Moreoever, on inserting the container 12 into the recess 15, the block 19 enters the opening 14 and causes first its lead-in surface 90 and then its bearing surface 99 to press down on the drum 13, which is thus urged downwardly to be positioned correctly with respect to the feed means 55 and the reading means 56 and is released for rotation.

Figure 3:
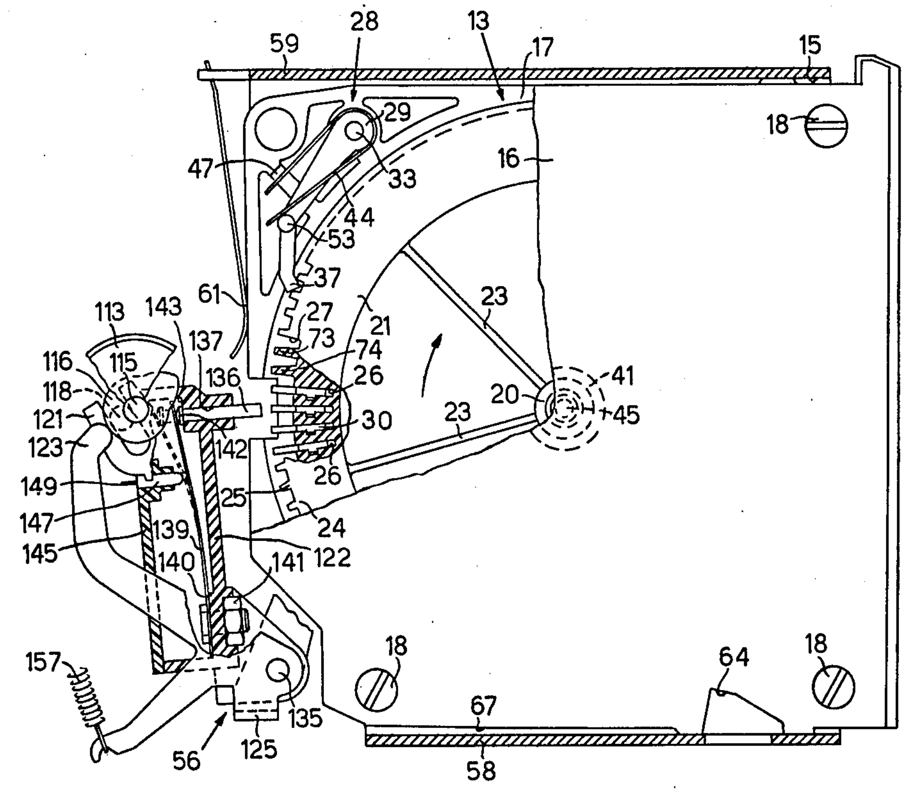
FIGS. 3 and 4 are second and third plan views, partly in section, showing other details of the system in the first working position.
Figure 4:
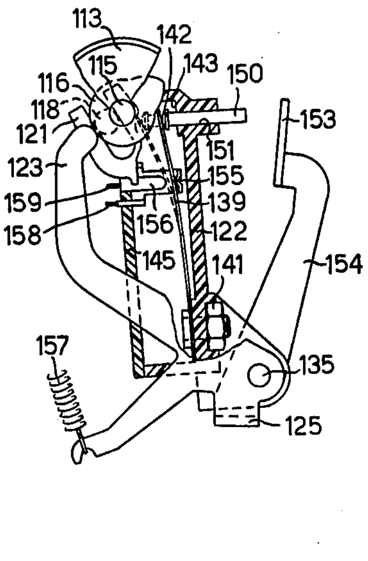

Under inoperative conditions, the feed means 55 of the drum 13 and the reading means 56 are stationary in the position shown in FIGS. 2, 3 and 4, the two elements 94 and 96 of the clutch 95 being disengaged from one another, while the driving unit 92 keeps the shaft 93 continuously in rotation.

By pushing the control key 76 to the left (FIG. 2), the lever 72 is caused to translate in opposition to the action of the spring 77 until its lug 83 is brought more to the left of the corresponding lug 85 of the slider 86. Under the action of the spring 91, this slider 86 is then pulled downwardly in FIG. 2. Consequently, the lever 103 is caused to turn clockwise and the movable part 98 of the coupling 100 is shifted upwardly until the two elements 94 and 96 of the clutch 95 are caused to be coupled to one another. In this way, the driven shaft 97 is also set in rotation.

In this position, moreover, the slider 86 being shifted downwardly, its lug 85, co-operating with the corresponding lug 83, prevents the lever 72 moving back to the right into the operative position and the tooth 160 co-operating with the stop 161 prevents the key 76 shifting further.

Owing to the coupling between the gears 112 and 113, the vertical shaft 115 is also set in rotation and, thus, also the cam 116, the eccentric 117 and the crank pin 118. The eccentric 117, on rotating, causes the bottom tooth 132 of the connecting rod 120 to perform a substantially elliptical anticlockwise movement such as to cause it first to engage with the toothed rim 24 and then to cause the drum 13 to rotate clockwise through a predetermined angle corresponding to the pitch of the toothing 24. In this way, at each revolution of the shaft 115 the drum 13 rotates by one step and is stopped in the position reached by the action of the positioning device 28.

Furthermore, with each revolution of the shaft 115, the pin 118, co-operating with the fork 121, causes the box 122 to perform a small oscillation about its pivot 135, thus bringing the sensors 136 towards the code bar 30 which is in correspondence with them at that instant. After the initial clockwise oscillation of the box 122 adapted to take up any play, those sensors 136 which encounter a tongue 32 stop and, owing to the advance of the box 122, they slide in the holes 137 relative to the box 122 itself and bend the respective leaf springs 139, which are carried against the fixed contacts 147 (position shown in dashes in FIG. 3) and carry the "1" bit information to the corresponding conductors 149. On the other hand, those sensors 136 which detect the absence of a tongue 32 follow the movements of the box 122 completely and do not bend the respective leaf springs 139 so that "0" bit information remains on the corresponding conductors 149.

The cam 116, rotating with the pin 118, causes the lever 125 to turn anticlockwise at the very instant when the box 122 is about to complete its clockwise oscillation (position shown in FIG. 5) and any possible rebounds on the contacts 147 are damped. By this anticlockwise rotation, the lever 125 brings its lug 153 against the synchronising sensor 150, which is shifted to the left with respect to the box 122, bringing the corresponding leaf spring 139 against the fixed contact 156 and rendering conducting the conductor 159, which enables the transfer of the signals to the conductors 149 to the internal memory of the machine.

The eccentric 117, the cam 116 and the pin 118 are angularly offset to one another, so that at each revolution of the shaft 115 there is first obtained the reading of the code bars 30, then the sending of the signals from the internal memory of the machine, and then the advance of the drum 13 by one step for a following reading operation.

On insertion of the container 12 in the recess 15, the drum 13 is located with the fixed tongue 73 in correspondence with the sensors 136, so that after starting the reading cycle by pushing the control key 76 the first elements to be sensed will not be the code bars 30, but the fixed tongues 73 and 74. Therefore, during the first two scanning operations, all the conductors 149 will be rendered conducting and there will be sent to the internal memory of the machine two instructions corresponding to the binary code "11111111", which prepare the memory to receive the information following.

After the detection of the fixed tongues 73 and 74, the reading true and proper of the program stored in the code bars 30 is obtained in the manner hereinbefore described. More particularly, the bars 30 are read in series starting from the one closest to the tongue 74.

After the drum 13 has been caused to rotate clockwise for a complete revolution, it is presented with its space 27 in correspondence with the bottom tooth 132 of the connecting rod 120. This causes the tooth 132, in its elliptical movement, and therefore the entire connecting rod 120, to perform an excursion greater than the others, to such a degree as to cause the top tooth 133 to engage with the recess 134 of the slider 86, which is thus pushed upwardly (FIG. 2). This produces the disengagement of the clutch 95 and the immediate arrest of the shaft 115. Moreover, in this way the lug 85 is removed from the path of the lug 83 and the lever 72 is carried back to the right into the inoperative position under the action of the spring 77.

In order to withdraw the container 12 from the recess 15, the control key 76 is shifted downwardly in FIG. 2, causing the lever 72 to turn clockwise. The lever 72 is engaged by means of its bottom bent portion 79 with the shoulder 80 of the lever 65 and removes the locking tooth 63 from the recess 64. Consequently, the container 12 is ejected by the leaf spring 61 from the recess 15.

Once the container 12 has been inserted in the recess 15 and the control key 76 has been moved to the left for the transfer of the program on the drum 13 to the internal memory of the machine 11, the container cannot be withdrawn before all the data stored in the drum 13 has been read. This is because, when the lever 72 has been shifted to the left, the lug 83 is arrested by the lug 85 and the tooth 160 is arrested by stop 161.

What we claim is:

1. In a system for introducing the instructions of a program into an accounting, calculating and similar programmable office machine which performs data-processing operations, comprising in combination: a container, a drum rotatably mounted therein, a series of code information storage elements defining said program, means for removably mounting said elements around the periphery of said drum, a control element mounted on said drum to indicate the end of said program; and a reading unit mounted on said office machine for reading said storage elements, mounting means for removably mounting said container with respect to said reading unit, actuatable feeding means for rotating said drum step by step with respect to said reading unit for the reading of said storage elements, locking means for locking said container on said office machine during the rotation of said drum, and means cooperative with said control element for deactivating said feeding means and releasing said locking means at the end of the reading of said program for allowing the removal of said container from said office machine.

2. A system according to claim 1, wherein the feeding means comprises a toothed rim at the periphery of said drum and an advance element engageable cyclically with the toothed rim to cause said drum to rotate step by step with respect to its container.

3. A system to claim 2, wherein each of said storage elements is associated with a corresponding tooth of the toothed rim and comprises a combination of projections and gaps spaced in a directing parallel to the axis of the drum, the reading unit comprising a corresponding plurality of sensors for the gaps and projections and means for moving the sensors away cyclically from the storage elements during the step-by-step advance of the drum.

4. A system according to claim 3, wherein the feeding means comprises a continuously rotating driving unit, means engageable by the toothed rim of the drum, and a manually engageable clutch for rotatably connecting the two, the cooperative means deactivating the clutch upon detection of said control element.

5. A system according to claim 4, wherein the control element comprises a slot formed in the periphery of the drum and the cooperative means includes means for engaging the slot to deactivate the clutch.

6. A system according to claim 5, wherein said slot is formed between two adjacent teeth of the toothed rim in correspondence with the last storage element of the program, and wherein the cooperative means comprises the advance element which cooperates with the slot of the toothed rim to produce the deactivation of the clutch and the arresting of the drum.

7. A system according to claim 6, wherein the clutch includes a control lever and wherein the advance element comprises a connecting rod having an intermediate zone thereof a first lug cooperative with the toothed rim and with the slot, and a second lug cooperative with the control lever of the clutch.

8. A system according to claim 1, wherein said locking means comprises a recess in said container, a first locking lever having a tooth and a spring for urging the tooth into the recess.

9. A system according to claim 8, comprising an operative key shiftable manually in a first direction to actuate the clutch and in a second direction to disengage the tooth from the recess after the reading of the data of the program and the deactivation of the clutch.

10. A system according to claim 9, further comprising means for maintaining the key in the second direction for disengaging the tooth and, during its shifting in the first direction, for allowing the control lever of the clutch to be shifted into a position such as to prevent the key returning to the operative position including a first spring for the key and a second spring for the control lever and means for preventing the key shifting in the second direction before the first lug of the advance element has cooperated with said slot of the toothed rim.

11. A system according to claim 1, wherein the storage elements comprise bars disposed parallel to the axis of the drum and each having a plurality of selectively removable tongues, the reading unit comprising a box inside which there are arranged sensing elements which are brought cyclically against the bars to detect the presence or absence of the tongues.

12. A system according to claim 1, wherein the drum has around its periphery a plurality of radial slots in which the storage elements are removably seated and a retaining flange removable from the drum for preventing the storage elements leaving the radial slots.

13. A program drum having a program cylinder for introducing instructions into a programmable office machine of the type comprising a feeding mechanism for rotating said cylinder, a reading unit for reading the program of said cylinder, a locking device and a sensing device for deactivating the feed mechanism and releasing the locking device at the end of the reading of the program, wherein the cylinder is mountable on a support removably mounted on the machine, said support being provided with a locking element engageable by the locking device of the machine, the cylinder comprising: transmission elements engageable by the feed mechanism at the mounting of the cylinder support on the machine and a control element which cooperates with the sensing device of the machine at the end of the reading of the program.

14. In a system for introducing the instructions of a program into an accounting, calculating and similar programmable office machine which performs data-processing operations and usable with a program container having a rotatably mounted drum therein, a series of code information storage elements for defining a program, means for removably mounting said elements around the periphery of said drum and a control element mounted on said drum to indicate the end of said program, wherein the improvement comprises:

reading means mounted on said office machine for reading said storage elements;

mounting means for removably mounting said container with respect to said reading means;

actuatable feeding means for rotating said drum step by step with respect to said reading means for the reading of said storage elements;

locking means for locking said container to said mounting means during the rotation of said drum; and means cooperative with said control element for deactivating said feeding means and releasing said locking means at the end of the reading of said program for allowing the removal of said container from said mounting means.

* * * * *